US010193840B1

(12) United States Patent
Dar

(10) Patent No.: US 10,193,840 B1
(45) Date of Patent: Jan. 29, 2019

(54) MESSAGE BLOCKING AND NETWORK QUEUING, FOR EXAMPLE WHILE RECIPIENT IS DRIVING

(71) Applicant: T-Mobile USA, Inc., Bellevue, WA (US)

(72) Inventor: Sheraz Dar, Maple Valley, WA (US)

(73) Assignee: T-Mobile U.S.A., Inc., Bellevue, WA (US)

( * ) Notice: Subject to any disclaimer, the term of this patent is extended or adjusted under 35 U.S.C. 154(b) by 0 days.

(21) Appl. No.: 15/665,387

(22) Filed: Jul. 31, 2017

(51) Int. Cl.

| H04W 4/16 | (2009.01) |
| H04W 4/21 | (2018.01) |
| H04W 88/16 | (2009.01) |
| H04W 8/26 | (2009.01) |
| H04L 12/58 | (2006.01) |
| H04W 8/02 | (2009.01) |
| H04W 4/14 | (2009.01) |
| H04L 29/06 | (2006.01) |
| H04W 84/04 | (2009.01) |

(52) U.S. Cl.
CPC ............. *H04L 51/12* (2013.01); *H04W 8/02* (2013.01); *H04L 51/10* (2013.01); *H04L 65/1016* (2013.01); *H04W 4/14* (2013.01); *H04W 84/042* (2013.01)

(58) Field of Classification Search
CPC ......... H04W 8/183; H04W 8/26; H04W 4/16; H04W 4/21; H04M 1/72572
USPC ................. 455/401, 432.1, 461, 466
See application file for complete search history.

(56) References Cited

U.S. PATENT DOCUMENTS

| 6,049,713 A * | 4/2000 | Tran ......................... H04Q 3/72 |
| | | 379/245 |
| 7,190,969 B1 * | 3/2007 | Oh ........................... H04W 8/26 |
| | | 455/461 |
| 7,929,683 B1 * | 4/2011 | Tran ........................ H04W 8/26 |
| | | 379/221.01 |
| 9,015,808 B1 * | 4/2015 | Koller .................. H04L 29/06857 |
| | | 726/4 |

(Continued)

OTHER PUBLICATIONS

Freeman, Kate. "5 Apps to Prevent Your Teen From Texting While Driving," Dec. 8, 2012. <https://mashable.com/2012/12/08/apps-texting-while-driving/#uyjotr025kq3>. 6 pages.

(Continued)

*Primary Examiner* — William D Cumming
(74) *Attorney, Agent, or Firm* — Perkins Coie LLP

(57) ABSTRACT

The disclosed system provides blocking of incoming messages that are intended to be received on a mobile device of a user who is operating a vehicle. When an incoming message is received, the disclosed system retrieves driving status information for the destination mobile device to determine whether it is in a vehicle that is being driven. If the destination mobile device is in a vehicle that is being driven, the system blocks message delivery to the recipient and places the incoming message in a holding queue. The system may notify the sender that the incoming message has been blocked. If the destination mobile device is not in a vehicle that is being driven, the system delivers the incoming message to the destination mobile device along with any messages in the holding queue. The system optionally notifies the sender that the incoming message and/or the previously queued messages have been delivered.

21 Claims, 9 Drawing Sheets

(56) References Cited

U.S. PATENT DOCUMENTS

| | | | | |
|---|---|---|---|---|
| 9,266,473 B1* | 2/2016 | Elwell | | B60W 40/09 |
| 9,838,528 B2* | 12/2017 | Abbott | | H04M 1/72572 |
| 9,848,308 B2* | 12/2017 | Demele | | H04W 4/21 |
| 2001/0005268 A1* | 6/2001 | Eguchi | | H04L 51/30 |
| | | | | 358/1.9 |
| 2002/0086672 A1* | 7/2002 | McDowell | | H04L 43/00 |
| | | | | 455/432.1 |
| 2004/0109439 A1* | 6/2004 | Kiss | | H04L 29/06 |
| | | | | 370/352 |
| 2004/0151192 A1* | 8/2004 | Trossen | | H04W 88/16 |
| | | | | 370/401 |
| 2004/0157629 A1* | 8/2004 | Kallio | | H04M 3/2281 |
| | | | | 455/466 |
| 2005/0070278 A1* | 3/2005 | Jiang | | H04W 8/183 |
| | | | | 455/432.3 |
| 2005/0192035 A1* | 9/2005 | Jiang | | H04W 8/26 |
| | | | | 455/461 |
| 2014/0223552 A1* | 8/2014 | Petersen | | H04L 63/0853 |
| | | | | 726/19 |
| 2015/0341290 A1* | 11/2015 | Cherifi | | H04L 51/043 |
| | | | | 709/206 |
| 2016/0021336 A1* | 1/2016 | Abbott | | H04M 1/72572 |
| | | | | 348/14.02 |
| 2017/0127255 A1* | 5/2017 | Archer | | H04W 4/16 |
| 2017/0195863 A1* | 7/2017 | Demele | | H04W 4/21 |
| 2018/0072321 A1* | 3/2018 | Mueller | | B60Q 9/00 |

OTHER PUBLICATIONS

Lalley, Colin. "5 apps to help you stop texting while driving." Feb. 12, 2016 <https://www.policygenius.com/blog/5-apps-to-help-you-stop-texting-while-driving/>, 3 pages.

Shamoon, Evan. "Best apps to block texting while driving." Jan. 24, 2016. <https://www.verizonwireless.com/archive/mobile-living/home-and-family/apps-to-block-texting-while-driving/>. 2 pages.

* cited by examiner

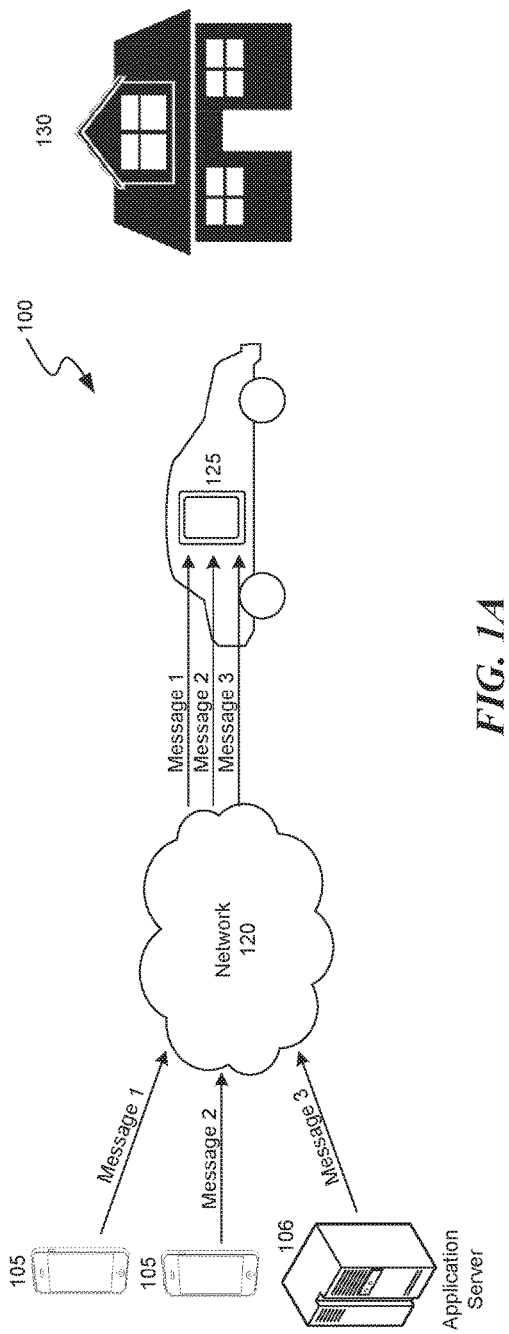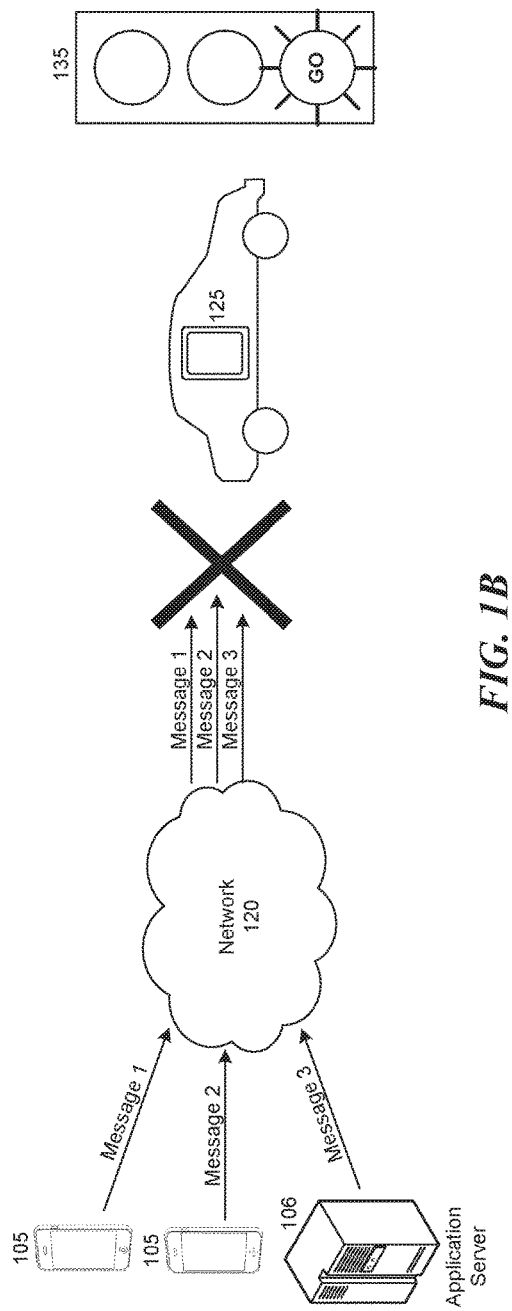

MESSAGE BLOCKING AND NETWORK QUEUING, FOR EXAMPLE WHILE RECIPIENT IS DRIVING

BACKGROUND

Texting or messaging while driving poses a well-known threat to drivers, passengers, and pedestrians on public roadways. In the United States, the National Highway Traffic Safety Administration (NHTSA) estimates that in 2015 alone, 3,477 people were killed as a result of distracted driving, which the NHTSA defines as any activity that diverts attention from driving, including texting or messaging on a mobile phone. Although these dangers are well known, many drivers nevertheless continue to engage in dangerous texting behavior. For some drivers, a false belief that the driver can pay attention to the road while also texting on a device may lead to risky behavior. For other drivers, the sheer temptation to read and respond to an incoming message may compel the driver to engage in risky behavior. While prior art systems have attempted to address these problems by blocking messages while driving, such systems fall short in several important respects. For example, prior art systems typically involve the installation of one or more third-party applications on a recipient's mobile device. A user of such a system therefore would have to take specific steps to locate and install one or more such applications to enable blocking functionality. These extra steps may present a barrier for certain users who are not sufficiently motivated to locate and install such software, or who lack the technical knowledge to do so. In addition, even after installation, the user would need to ensure that the software is activated and resist the temptation to uninstall or otherwise disable the software in order to resume dangerous texting activity. These and other problems exist with prior art systems.

BRIEF DESCRIPTION OF THE DRAWINGS

FIGS. 1A and 1B are diagrams of a representative environment in which a message blocking system may operate.

DETAILED DESCRIPTION

Figure 2:
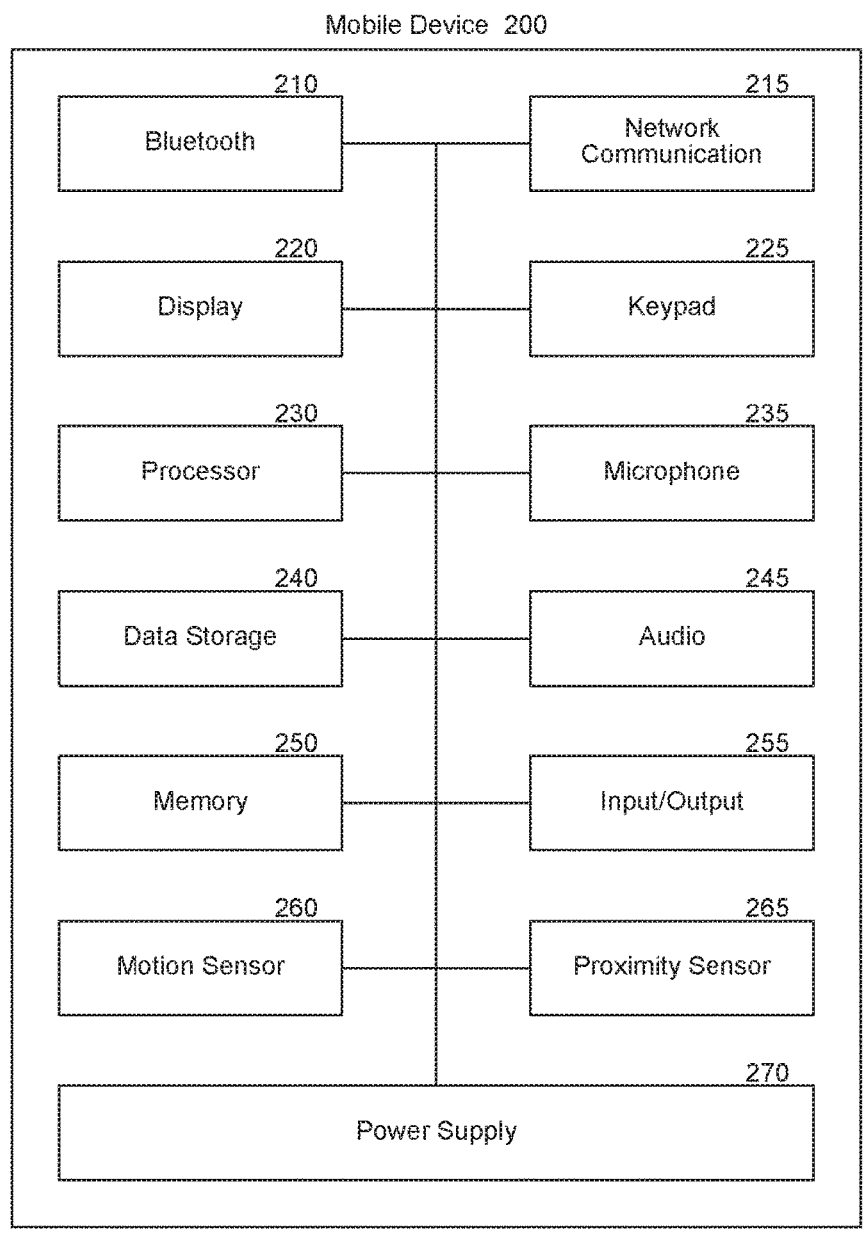
FIG. 2 is a block diagram of a representative mobile device that may receive incoming messages or have incoming messages blocked in accordance with embodiments herein.

The disclosed system provides network-implemented blocking and queuing of incoming notifications, texts, emails, update, etc. (collectively, "messages") that are intended to be received on a mobile device of a user who is busy and not to be distracted or disturbed, e.g. while operating a vehicle. Short Message Service (SMS), Multimedia Messaging Service (MMS), and Rich Communication Services (RCS) messages may be sent using a Multimedia Messaging Service Center (MMSC). The system is adapted to operate in various types of telecommunications networks, including second-generation wireless telephone technology (2G) networks, third-generation wireless telephone technology (3G) networks, fourth-generation wireless telephone technology (4G) networks, and long-term evolution (LTE) networks. The mobile device senses whether or when it is in motion and updates the telecommunications network with an indication of the mobile device being in motion. Alternatively, the mobile device updates the telecommunications network with the actual speed at which it is traveling. The mobile device may employ one or more various mechanisms to sense movement, including for example GPS coordinates and an internal clock. In certain embodiments, the mobile device is adapted to determine the proximity of the mobile device to the driver's position in an automobile (e.g., proximity of the mobile device to a steering wheel, driver's side door, or instrument panel). By doing so, the system is able to block messages to the driver of an automobile while allowing normal message delivery to passengers in the same vehicle.

In the disclosed system, the mobile device may include a variety of information when updating the telecommunications system on mobile device's driving status. Such additional information may include, for example, an actual or estimated driving speed (e.g., miles-per-hour or kilometers-per-hour), a physical location of the mobile device (e.g., GPS coordinates), an identification of a server or other network component that is serving the mobile device (e.g., a short message service center (SMSC)), and/or proximity information indicative of whether the mobile device belongs to a driver or a passenger of a vehicle.

The mobile device may update its driving status through a variety of mechanisms. For example, the mobile device may send a Location Update (LU) command that is modified to include a specialized "isDriving" field, which indicates whether the mobile device is being driven or the user of the mobile device should otherwise not be distracted. Alternatively or additionally, the isDriving field includes an indication of a speed at which the mobile device is being driven.

In the disclosed system, a location update may be triggered under a variety of conditions. For example, a mobile device may trigger a location update in the network when the mobile device detects that it is inside a moving vehicle, when the mobile device detects that it is no longer inside a moving vehicle, or when the mobile device moves from one cell site to another. In addition, a mobile device may trigger a location update when the mobile device connects to various network components, such as when the mobile device moves between Mobile Switching Centers/Mobile Switching Stations (MSC/MSS). In the disclosed system, the received location updates are stored in the telecommunications network (e.g., in a subscriber profile in a Home Location Register (HLR) or Home Subscriber Server (HSS)) for later retrieval when the system needs to determine whether to block delivery of an incoming message.

When the network receives a message for a destination mobile device, the disclosed system retrieves or accesses the most recent status information for the destination mobile device. In one embodiment, a SMSC transmits a send routing information (SRI-SM) request to the HLR to retrieve the (1) MSC location, (2) driving status (e.g., the isDriving field), and/or (3) proximity information of the destination mobile device. In another embodiment, a messaging application server (AS) transmits a user data request (UDR) or subscriber notification request (SNR) to retrieve the MSC location, driving status (e.g., the isDriving field), and/or proximity information of the destination mobile device. After the system retrieves the most recent status information for the destination mobile device, the system determines whether to deliver the message to the destination mobile device or block the message. In some embodiments, the determination of whether to deliver or block the message is performed by the SMSC or an application server. If the system determines that the destination mobile device is in a vehicle that is being driven, then the system may block message delivery to the recipient by placing the message in a holding queue rather than forwarding the message to the destination mobile device. When blocking a message, the system may notify the sender that the message has been blocked. If the system determines that the destination mobile device is not in a vehicle that is being driven, then the system may deliver the message to the destination mobile device along with any messages that were previously blocked and placed in the holding queue for later delivery. When sending any such messages to the destination device, the system may notify the sender that the message has been delivered. In some embodiments, the notification of a blocked message and/or the notification of a delivered message may be performed by the SMSC or an application server. In addition, in some embodiments, one or more messaging application servers (AS) has an interface to the HSS and queries the value of the isDriving field, for example via Diameter protocol UDR or SNR. The messaging application servers may include SIP SIMPLE (session initiation protocol for instant messaging and presence leveraging extensions) based platforms or Rich Communication Services (RCS) and Converged IP Messaging (CPM) based platforms.

Of course, the invention is not limited to use while driving. Indeed, the system may automatically set an additional or alternative field, such as an "isBusy" field, based on system, network and/or user-defined events, such as when entering a movie theater, symphony hall, or similar venue where the user should not be distracted or disturbed. Once the user leaves such a venue, the network releases to the user's mobile device all messages within the network holding queue in a similar fashion as described herein with respect to the isDriving field. Of course, the system can allow the user to change such settings and allow messages to be provided to the user's mobile device when at such a venue.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIGS. 1A and 1B are diagrams of a representative environment 100 in which a message blocking system may operate. In the environment 100, originating mobile devices 105 and/or originating application server 106 transmit one or more messages to receiving mobile device 125 via an network 120. Network 120 may be any telecommunications network capable of connecting a mobile device to a telecommunications provider. Mobile devices 105 and 125 may include virtually any devices for communicating over a wireless network. Such devices include application servers or mobile telephones, such as Global System for Mobile Communications ("GSM") telephones, Time Division Multiple Access ("TDMA") telephones, Universal Mobile Telecommunications System ("UMTS") telephones, Evolution-Data Optimized ("EVDO") telephones, Long Term Evolution ("LTE") telephones, Generic Access Network ("GAN") telephones, Unlicensed Mobile Access ("UMA") telephones, and other mobile computers or devices, such as Voice over Internet Protocol ("VoIP") devices, Secure User Plane Location ("SUPL") Enabled Terminals (SETs), Personal Digital Assistants ("PDAs"), radio frequency devices, infrared devices, handheld computers, laptop computers, wearable computers, tablet computers, pagers, integrated devices combining one or more of the preceding devices, and/or the like.

Given such variety, mobile devices 105 and 125 may range widely in terms of features and capabilities. As one example, mobile devices may have widely different hardware and software configurations that affect which location determination techniques may be utilized to locate the physical location and speed of a mobile device (e.g., its latitude and longitude, or speed in miles-per-hour or kilometers-per-hour). As another example, the configuration of a mobile device may affect the performance (e.g., accuracy, precision, time to fix) of a location determination technique or speed determination technique used to physically locate the device or gauge the speed of the device.

Mobile devices 105 and 125 typically include a processing unit, volatile memory and/or nonvolatile memory, a power supply, one or more network interfaces, an audio interface, a display, a keypad or keyboard and other input and/or output interfaces. Mobile devices 105 and 125 also may include motion sensors, GPS units, proximity sensors, and other devices adapted to sense the mobile device's location, speed, and/or proximity to certain locations such as a driver's position in an automobile (e.g., a steering wheel, instrument panel, driver's side door, car keys or transmitter). The various components of a mobile device may be interconnected via a bus. The volatile and nonvolatile memories generally include storage media for storing information such as processor-readable instructions, data structures, program modules, or other data. Some examples of information that may be stored include basic input/output systems (BIOS), operating systems, and applications.

Mobile devices 105 and 125 may connect to a telecommunications network via a trusted radio access network (RAN) or an untrusted RAN (not shown). A single mobile device may be capable of using one or both types of RANs. The RANs may use any wireless communications and data protocol or standard, such as GSM, TDMA, UMTS, EVDO, LTE, GAN, UMA, Code Division Multiple Access ("CDMA") protocols (including IS-95, IS-2000, and IS-856 protocols), Advanced LTE or LTE+, Orthogonal Frequency Division Multiple Access ("OFDM"), General Packet Radio Service ("GPRS"), Enhanced Data GSM Environment ("EDGE"), Advanced Mobile Phone System ("AMPS"), WiMAX protocols (including IEEE 802.16e-2005 and IEEE 802.16m protocols), Wireless Fidelity ("WiFi"), High Speed Packet Access ("HSPA"), (including High Speed Downlink Packet Access ("HSDPA") and High Speed Uplink Packet Access ("HSUPA")), Ultra Mobile Broadband ("UMB"), SUPL, and/or the like.

As described in more detail herein, the disclosed message blocking system is adapted to deliver messages from one or more message originators such as mobile devices 105 or application servers 106 to a receiving mobile device if the receiving mobile device is not in motion. For example, as illustrated in FIG. 1A, if the user of a destination mobile device is inside a vehicle 125 that is parked at the driver's home 130, the message blocking system would deliver incoming messages "Message 1," "Message 2," and "Message 3" to the mobile device since vehicle 125 is at rest. However, as illustrated in FIG. 1B, if the user of the destination mobile device is inside a vehicle 125 that is in motion (e.g., passing through traffic signal 135), then "Message 1," "Message 2," and "Message 3" are not delivered to the destination mobile device. Rather, as described in more detail herein, the disclosed system is adapted to queue the incoming messages within the network for later delivery after the destination mobile device is no longer in motion or is traveling at a speed that is below a predetermined threshold value (e.g., under 5 miles per hour or under 2 miles per hour) that may be set by a telecommunications network provider. In some embodiments, the disclosed system may be configured to set the isDriving field to FALSE after the mobile device has not been in motion for a predetermined amount of time. For example, if the mobile device is stopped only briefly (e.g. less than 5 minutes) at a traffic light, then the disclosed system may not update the isDriving field to indicate that the mobile device is not moving. By contrast, if the mobile device is stopped for a longer period of time (e.g., 5 minutes or more) because the car is parked in a parking lot, then the system may then update the isDriving field to TRUE. By updating the isDriving flag after a predetermined amount of time, the disclosed system avoids delivery of messages to a mobile device that is stopped for brief periods of time (such as while waiting for a traffic light to turn green) and therefore avoids tempting a user to continue texting activity when the vehicle resumes motion. In other embodiments, and as further described herein, the disclosed system may be configured to block delivery of messages only if the destination mobile device is in close proximity to the driver's position in a vehicle, such as near the steering wheel, instrument panel, driver's side door. By using such proximity information, the disclosed system is able to selectively block messages to the driver of a vehicle while allowing passengers in the vehicle to engage in normal texting activity.

FIG. 2 is a block diagram 200 of a representative mobile device that may receive incoming messages or have incoming messages blocked in accordance with embodiments herein. Each mobile device 200 typically includes a processor 230 for executing processing instructions, a data storage medium component 240 (e.g., hard drive, flash memory, memory card, etc.), volatile memory and/or nonvolatile memory 250, a power supply 270, one or more network interfaces (e.g., Bluetooth Interface 210; and Network Communication Interface 215, which enables the mobile phone to communicate by transmitting and receiving wireless signals using licensed, semi-licensed or unlicensed spectrum over a telecommunications network), an audio interface 245, a display 220, a keypad or keyboard 225, a microphone 235, other input and/or output interfaces 255, a motion sensor 260 (e.g., speedometer, accelerometer, GPS unit, etc.), and proximity sensor 265. Proximity sensor 265 may operate independently or in combination with additional equipment in a vehicle to sense the distance between the mobile device and a steering wheel. The various components of the mobile device may be interconnected via a bus. The volatile and nonvolatile memories generally include storage media for storing information such as processor-readable instructions, data structures, program modules, or other data. Some examples of information that may be stored include basic input/output systems (BIOS), operating systems, and applications. The stored information may include one or more SIP or Diameter protocol clients capable of generating, transmitting and interpreting syntactically correct SIP or Diameter protocol messages. SIP clients permit the mobile device to register with and communicate via the IMS network.

Figure 3:
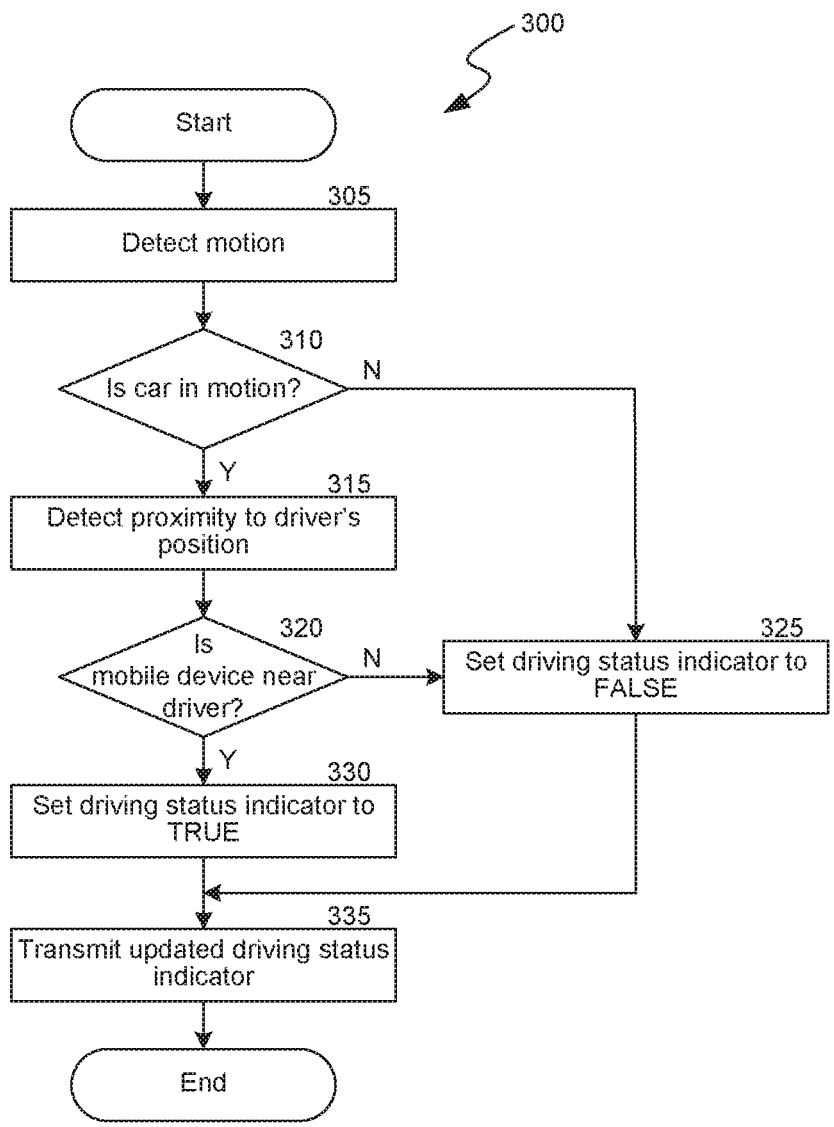
FIG. 3 is a flow diagram of a procedure 300 for updating a telecommunications network of the driving status of a mobile device.

FIG. 3 is a flow diagram of a procedure 300 for updating a telecommunications network of the driving status of a mobile device. The update procedure 300 may be executed in response to one or more trigger conditions. For example, update procedure 300 may execute when a mobile device registers on a telecommunications network, powers on, transitions from one cell tower to another, or senses a change in motion (e.g., stopping motion, starting motion, moving at a slower speed, or moving at a faster speed). As further examples, update procedure 300 may execute at periodic intervals that may be configured by a telecommunication network operator, or in response to a request for a location update (e.g., when a particular application server requests a location update). At step 305, the mobile device senses whether the mobile device is in motion. In some embodiments, the mobile device additionally detects a speed at which the mobile device is moving. The mobile device may sense motion based on data from a GPS unit in the mobile device and a clock, based on data from an accelerometer or speedometer in the mobile device, or based on information received directly from a vehicle in which the mobile device is located (e.g., from one or more computer systems embedded in the vehicle and coupled to the mobile device via Bluetooth or other data interface). When detecting motion, the device may return an indication that the device is in motion if the device is traveling at any speed above zero miles per hour. Alternatively, the device may indicate that the device is in motion only if the device is traveling at a speed above a predetermined threshold value that may be set by a telecommunications network provider. In some embodiments, the system is configured to apply different motion threshold values in various different operating conditions. For example, the motion threshold may be lower or surface roads, in construction zones, in heavier traffic conditions, or during inclement weather conditions. Similarly, the motion threshold value may be may be higher when the mobile device is traveling on an interstate highway or in lighter traffic conditions.

At step 310, if the mobile device determines that the mobile device is not in motion or that the mobile device is moving at a speed that is below a threshold value, the system proceeds to step 325 and sets a driving status indicator—such as an "isDriving" field—to a value of zero or false. The system then proceeds to step 335 to send an updated location information (including the isDriving field) to the telecommunications network for processing as described below with reference to FIG. 4. Returning to step 310, if the mobile device determines that the mobile device is in motion or is moving at a speed above a threshold value, in some embodiments the system proceeds to step 315 to determine whether the mobile device is in proximity to a driver's position in a vehicle. The mobile device may detect proximity to a steering wheel or other any other component of a vehicle that is indicative of a driver's position (e.g., proximity to a steering wheel, instrument panel, car keys or transmitter, or driver side door). The proximity sensing may work in conjunction with one or more devices or systems that are external to the mobile device, such as a sensor attached to a steering wheel or driver side door and adapted to communicate with the mobile phone (or adapted to allow the mobile phone to sense a distance from the sensor). At step 320, if the system has determined that the mobile device is not in proximity to the driver of a vehicle, then the system proceeds to step 325 to set the isDriving field to false, and then proceeds to step 335 to update the isDriving field on the telecommunications network. However, if at step 320 the system determines that the mobile device is in proximity to the driver's position, then the system proceeds to step 330 and sets the isDriving field to true and then proceeds to step 335 to update the isDriving field on the telecommunications network.

Figure 4:
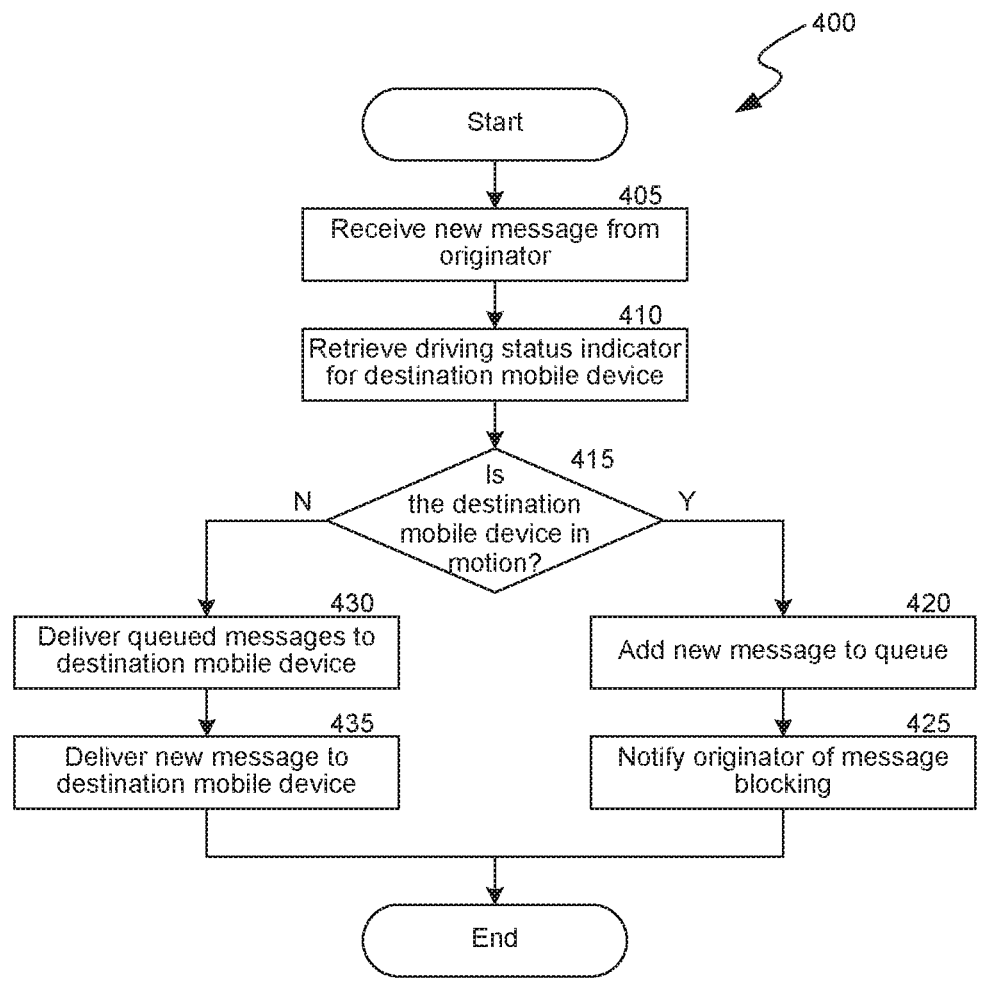
FIG. 4 is a flow diagram of a process for implementing message blocking in accordance with embodiments herein.

FIG. 4 is a flow diagram of a process 400 for implementing message blocking in accordance with embodiments herein. At step 405, the system receives a new message intended for delivery to a destination mobile device. At step 410, the system retrieves a driving status indicator for the destination mobile device. For example, the system may retrieve the isDriving field from a component within the telecommunications network (e.g., a HSS or HLR). At step 415, if the retrieved driving status indicates that the destination mobile device is in motion or is traveling at a speed above a threshold, then the system adds the new message to a holding queue at step 420 and declines to deliver the new message to the destination mobile device. In some embodiments, at step 425 the system may transmit a notification to the originator of the new message (e.g., a sending mobile device or application) to inform the originator that the message has not been delivered to the recipient. Returning to step 415, if the retrieved driving status indicates that the destination mobile device is not in motion or is traveling at a speed below a threshold, the system proceeds to step 430 to deliver all previously queued messages to the destination mobile device, and proceeds to step 435 to deliver the new message to the destination mobile device. In some embodiments, at steps 430 and 435 the system transmits a notification to the originator of each delivered message to notify the originator that the message has been sent to the destination mobile device.

Figure 5:
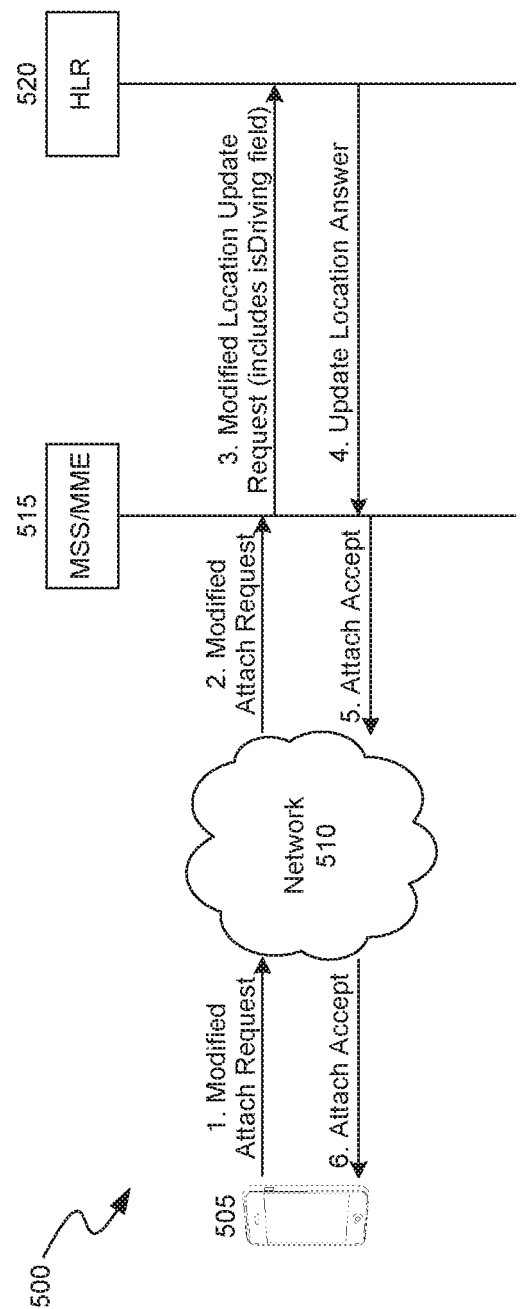
FIG. 5 is a call flow diagram showing a location update procedure in accordance with an embodiment herein.

FIG. 5 is a call flow diagram showing a location update procedure 500 in accordance with an embodiment herein. The location update procedure 500 modifies an attach request to include a driving status field for designating whether a recipient mobile device is located inside a vehicle that is being driven. At step 1, mobile device 505 transmits a modified attach request towards network 510. The disclosed system modifies the attach request to include an "isDriving" field that indicates whether or not the mobile device is located inside a vehicle that is in motion. For example, the disclosed system may set a field value of '0' to indicate that the mobile device is not located in a vehicle that is being driven and '1' to indicate that the mobile device is located inside a vehicle that is being driven. Additionally or alternatively, the isDriving field may contain an indication of the speed at which the mobile device is moving. For example, the isDriving field may contain a value of '0' corresponding to zero speed, '1' corresponding to a slow speed, '2' corresponding to a medium speed, or '3' corresponding to a high speed. As a further example, the isDriving field may contain a value corresponding to the actual speed at which the mobile device is traveling (e.g., a value of '45' corresponding to a speed of 45 miles-per-hour.)

At step 2, one or more components of network 510 transmits the modified attach request towards Mobile Switching Center Server/Mobility Management Entity (MSS/MME) 515. At step 3, MSS/MSE 515 transmits an update location request towards HLR 520. The system modifies the update location request of step 3 to include the isDriving field. At step 4, HLR 520 transmits an update location answer towards MSS/MME 515. At step 5, MSS/MME 515 transmits an attach accept towards network 510. At step 6, network 510 transmits the attach accept towards mobile device 505. The disclosed system may employ a variety of protocols to perform location update procedure 500. For example, the system may use the S1 AP protocol to send modified attach requests to and from mobile device 505, network 410, and MSS/MME 515. As another example, the system may use the Diameter protocol to send a modified update location request from MSS/MME 515 to HLR 520, and to send an update location answer from HLR 520 to MSS/MME 515.

Figure 6:
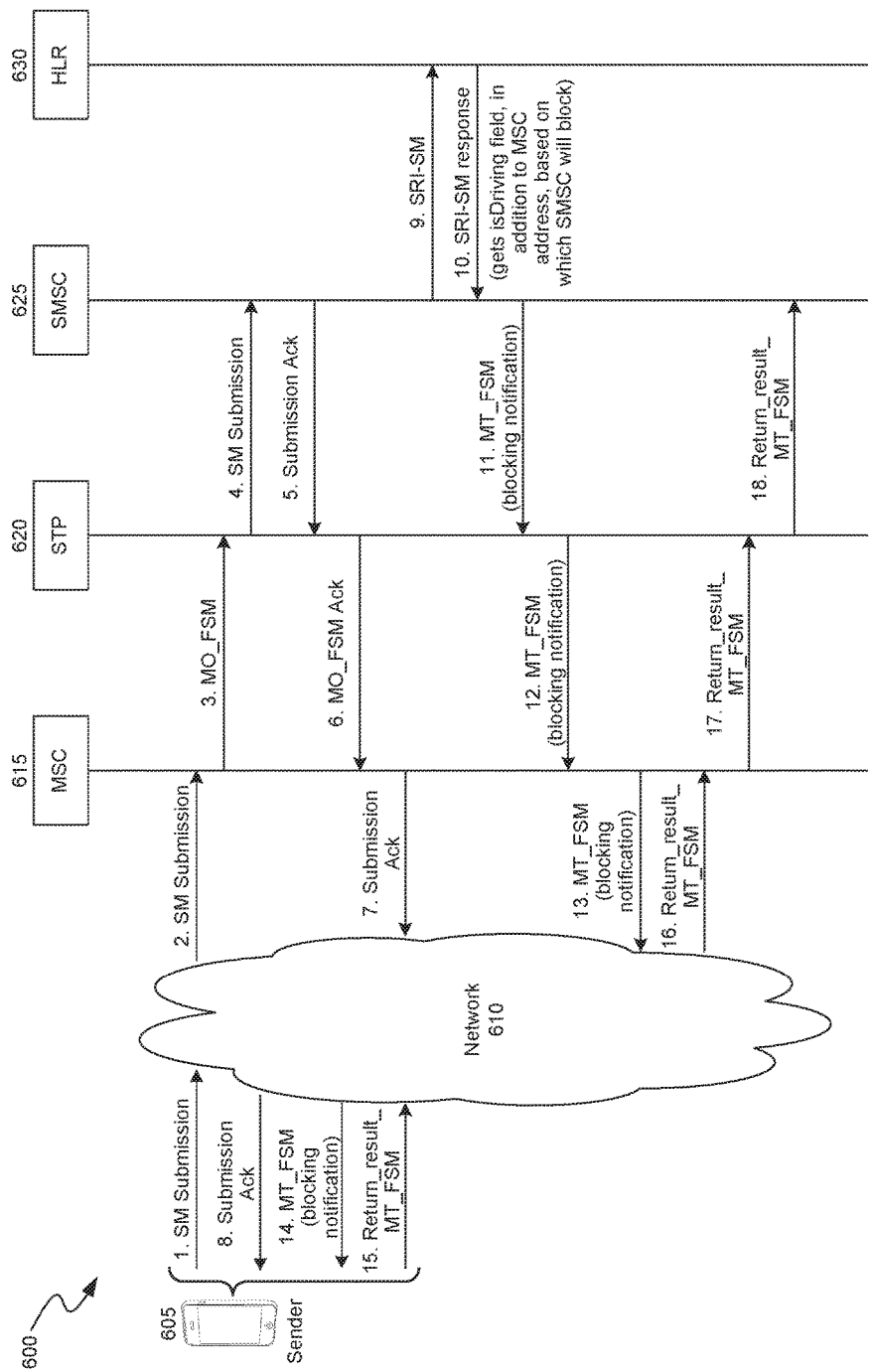
FIG. 6 is a call flow diagram showing a message procedure in accordance with an embodiment herein.

FIG. 6 is a call flow diagram showing a message procedure 600 in accordance with an embodiment herein. Steps 1-8 depict a procedure for sending a Mobile Originated Forward Short Message ("MO_FSM") from an originating mobile device to a telecommunications network and receiving an acknowledgement back at the originating mobile device. At step 1, mobile device 605 transmits a Short Message (SM) submission towards network 610. Network 610 transmits the SM submission towards MSC 615 (step 2). MSC 615 transmits MO_FSM towards STP 620 (step 3). STP 620 transmits SM submission towards SMSC 625 (step 4). After receiving SM submission at step 4, SMSC 625 transmits Submission Ack towards STP 620 (step 5). STP 620 transmits MO_FSM Ack towards MSC 615 (step 6). MSC 615 transmits Submission Ack towards network 610 (step 7), and MSC 615 transmits Submission Ack towards mobile device 605 (step 8). In addition to transmitting Submission Ack towards STP 620 (step 5), SMSC 625 also transmits a Send Routing Information for Short Message (SRI_SM) towards HLR 630. At step 10, HLR 630 transmits a SRI_SM response towards SMSC 625. The SRI_SM response includes the address of the MSC that serves the destination mobile device, as well as the isDriving field for the destination mobile device.

In the event that the isDriving field indicates that the destination mobile device is being driven, SMSC 625 transmits a MT_FSM towards STP 620 (step 11) to notify the message originator that the message will be blocked. STP 620 transmits MT_FSM towards MSC 615 (step 12), MSC 615 transmits MT_FSM towards network 610 (step 13), and network 610 transmits MT_FSM towards mobile device 605 (step 14). To acknowledge receipt, mobile device 605 transmits Return_result_MT_FSM towards network 610 (step 15), network 610 transmits Return_result_MT_FSM towards MSC 615 (step 16), MSC 615 transmits Return_result_MT_FSM towards STP 620 (step 17), and STP 620 transmits Return_result_MT_FSM towards SMSC 625 (step 18). The disclosed system may employ a variety of protocols to perform message procedure 600, including for example the SS7 MAP protocol. The message procedure 600 depicts an instance in which the isDriving field indicates that the mobile device is being driven. Accordingly, in the depicted message procedure 600, the system does not forward a message to the destination mobile device. However, in instances where the isDriving field indicates that the destination mobile device is not in motion, the disclosed system instead forwards the message to the destination device and may notify the message originator that the message has been delivered (not shown).

Figure 7:
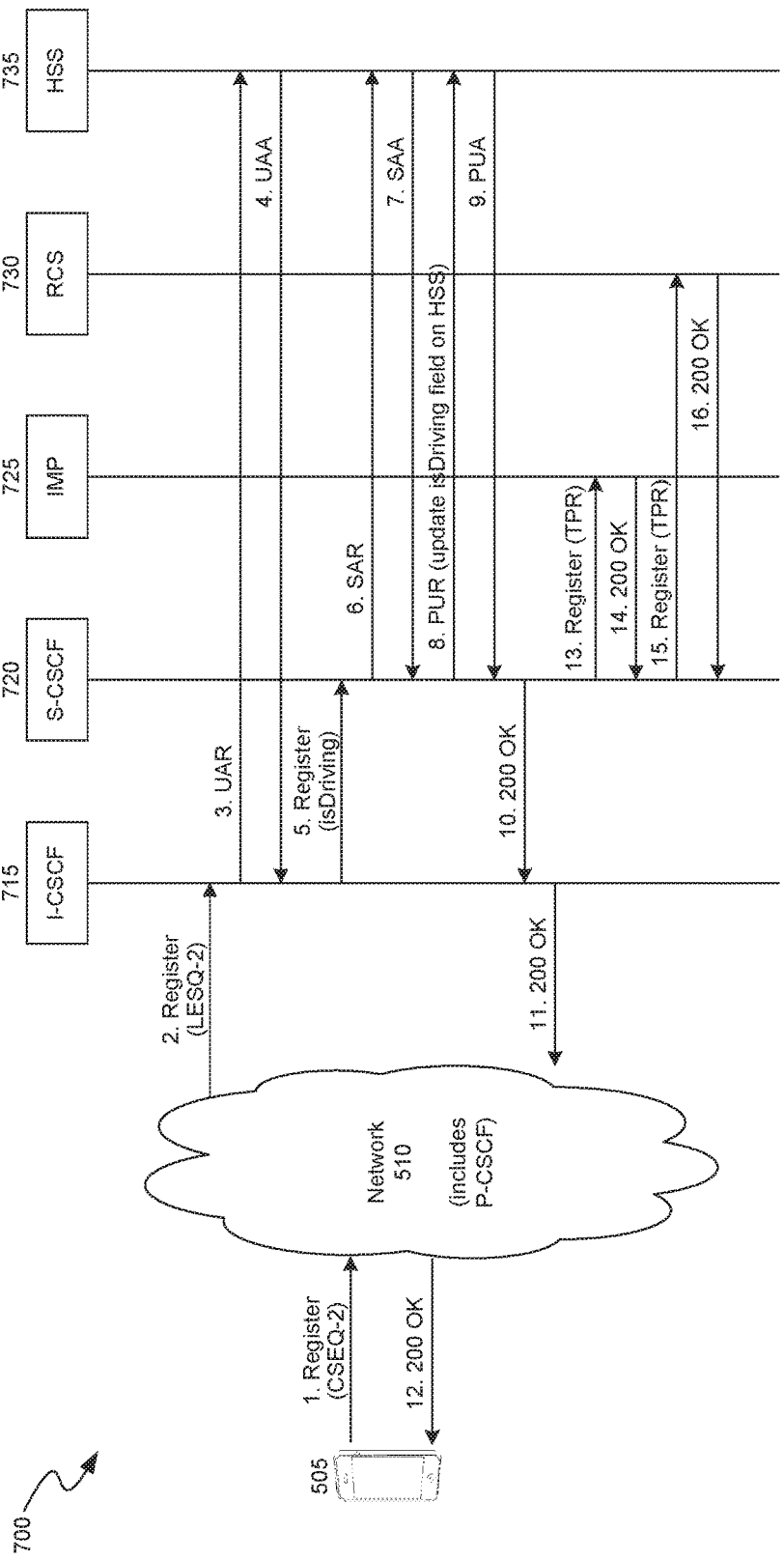
FIG. 7 is a call flow diagram showing a procedure for registering a mobile device in an Internet Protocol Multimedia Subsystem (IMS) network in accordance with an embodiment herein.

FIG. 7 is a call flow diagram showing a procedure 600 for registering a mobile device in an Internet Protocol Multimedia Subsystem (IMS) in accordance with an embodiment herein. IMS is an architecture framework for delivering Internet Protocol ("IP") multimedia to mobile users, such as users of mobile devices. An IMS core network ("IMS core") permits wireless and wireline devices to access multimedia, messaging, and voice applications and services. IMS standards and specifications have been promulgated by the 3rd Generation Partnership Project ("3GPP"™). To ease the integration of an IMS core with Internet resources, 3GPP specifications use Internet Engineering Task Force protocols within the IMS core, such as Session Initiation Protocol ("SIP") and Diameter.

SIP is a signaling protocol used for creating, modifying and terminating two-party or multiparty sessions consisting of one or several media streams. A mobile device registers its IP address with a SIP registrar server within an IMS core by generating and sending a SIP request message with a "REGISTER" method token. Once registered, a mobile device may subsequently establish multimedia sessions via the IMS core. The IMS core comprises various Call Session Control Functions ("CSCF") and other components that, inter alia, provide SIP registrar and proxy functionality. The IMS core comprises a proxy CSCF ("P-CSCF"), an interrogating CSCF ("I-CSCF"), a serving CSCF ("S-CSCF") 116, a Security Gateway ("SEG")/Session Border Controller ("SBC") 110, and a Home Subscriber Server ("HSS") 114. The basic functionalities of the IMS core components are described by standards promulgated by the 3GPP, including 3GPP TS 23.002, version 9.2.0 Release 9, which is hereby incorporated by reference herein in its entirety.

At step 1, mobile device 705 transmits a register message towards network 710. The register message includes a value for an isDriving field to indicate whether the user of the recipient mobile device is currently driving. Network 710 transmits the register messages towards I-CSCF 715 (step 2). I-CSCF 715 transmits a User Authentication Request (UAR) towards HSS 735 (step 3), and HSS 735 transmits a User Authentication Answer (UAA) towards I-CSCF 715 (step 4). In addition to sending the UAR towards HSS 735 (step 3), I-CSCF 715 transmits the register request (including the isDriving field) towards S-CSCF 720 (step 5). S-CSCF 720 transmits Server Assignment Request (SAR) towards HSS 735 (step 6), and HSS 735 transmits Server Assignment Answer (SAA) towards S-CSCF 720 (step 7). S-CSCF 720 transmits a Profile Update Request (PUR) towards HSS 735 (step 8) to set the isDriving field on HSS 735, and HSS 735 transmits Profile Update Answer (PUA) towards S-CSCF 720 (step 9). S-CSCF 720 transmits 200 OK towards I-CSCF 715 (step 10), I-CSCF 715 transmits 200 OK towards network 710 (step 11), and network 710 transmits 200 OK towards mobile device 705 (step 12). In addition, S-CSCF 720 transmits a registration message towards IMP 725 (step 13), and IMP 725 transmits 200 OK towards S-CSCF 720 (step 14). S-CSCF 720 also transmits a register message towards RCS 730 (step 15), and RCS 730 transmits 200 OK towards S-CSCF 720 (step 16). The disclosed system may employ a variety of protocols to perform the registration procedure 600. For example, the system may use SIP to send and receive Register messages, and may use the Diameter protocol to send and receive UAR, UAA, SAR, SAA, PUR, PAA.

Figure 8:
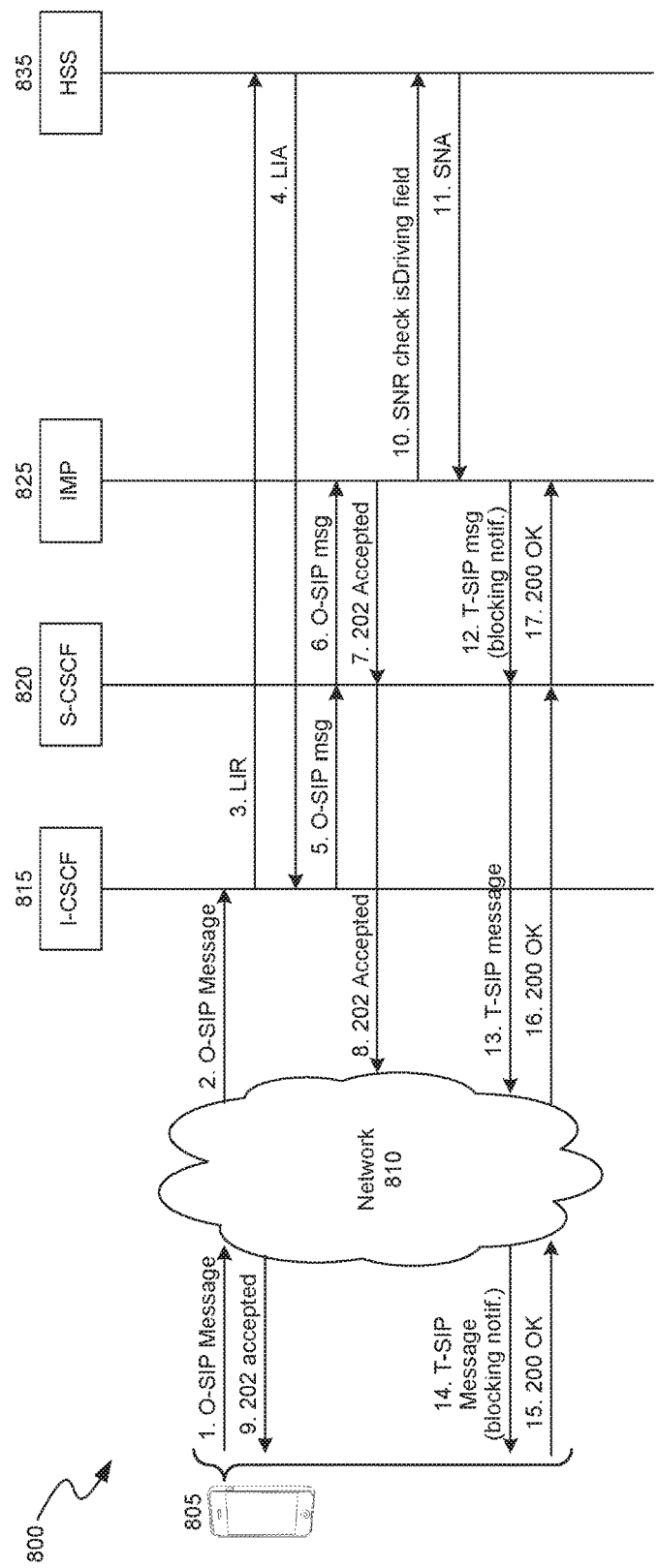
FIG. 8 is a call flow diagram showing an SIP MESSAGE procedure in an IMS network in accordance with an embodiment herein.

FIG. 8 is a call flow diagram showing an SIP MESSAGE procedure 800 in an IMS network in accordance with an embodiment herein. Mobile device 805 transmits Originating Session Initiation Protocol (O-SIP) Message towards network 810 (step 1). Network 810 transmits O-SIP Message towards Interrogating Call Session Control Function (I-CSCF) 815 (step 2). I-CSCF 815 transmits Location-Info-Request (LIR) towards HSS 835 (step 3). HSS 835 transmits Location-Info-Answer (LIA) towards I-CSCF 815 (step 4). I-CSCF 815 transmits O-SIP Message towards Serving Call Session Control Function (S-CSCF) 820 (step 5). S-CSCF 820 transmits O-SIP Message towards IP multimedia private identity (IMP) 825 (step 6). IMP 825 transmits 202 accepted towards S-CSCF 820 (step 7). S-CSCF 820 transmits 202 accepted towards network 810 (step 8). Network 810 transmits 202 accepted towards mobile device 805 (step 9). IMP 825 transmits Subscribe-Notifications-Request (SNR) (to check isDriving field) towards HSS 835 (step 10). HSS 835 transmits Subscribe-Notifications-Answer (SNA) towards IMP 825 (step 11). IMP 825 transmits Terminating Session Initiation Protocol (T-SIP) Message (blocking notification) towards S-CSCF 820 (step 12). S-CSCF 820 transmits T-SIP Message (blocking notification) towards network 810 (step 13). Network 810 transmits T-SIP Message (blocking notification) towards mobile device 805 (step 14). Mobile device 805 transmits 200 OK towards network 810 (step 15). Network 810 transmits 200 OK towards S-CSCF 820 (step 16). S-CSCF 820 transmits 200 OK towards IMP 825 (step 17). The disclosed system may employ a variety of protocols to perform the messaging procedure 800, including SIP and Diameter protocol.

Figure 9:
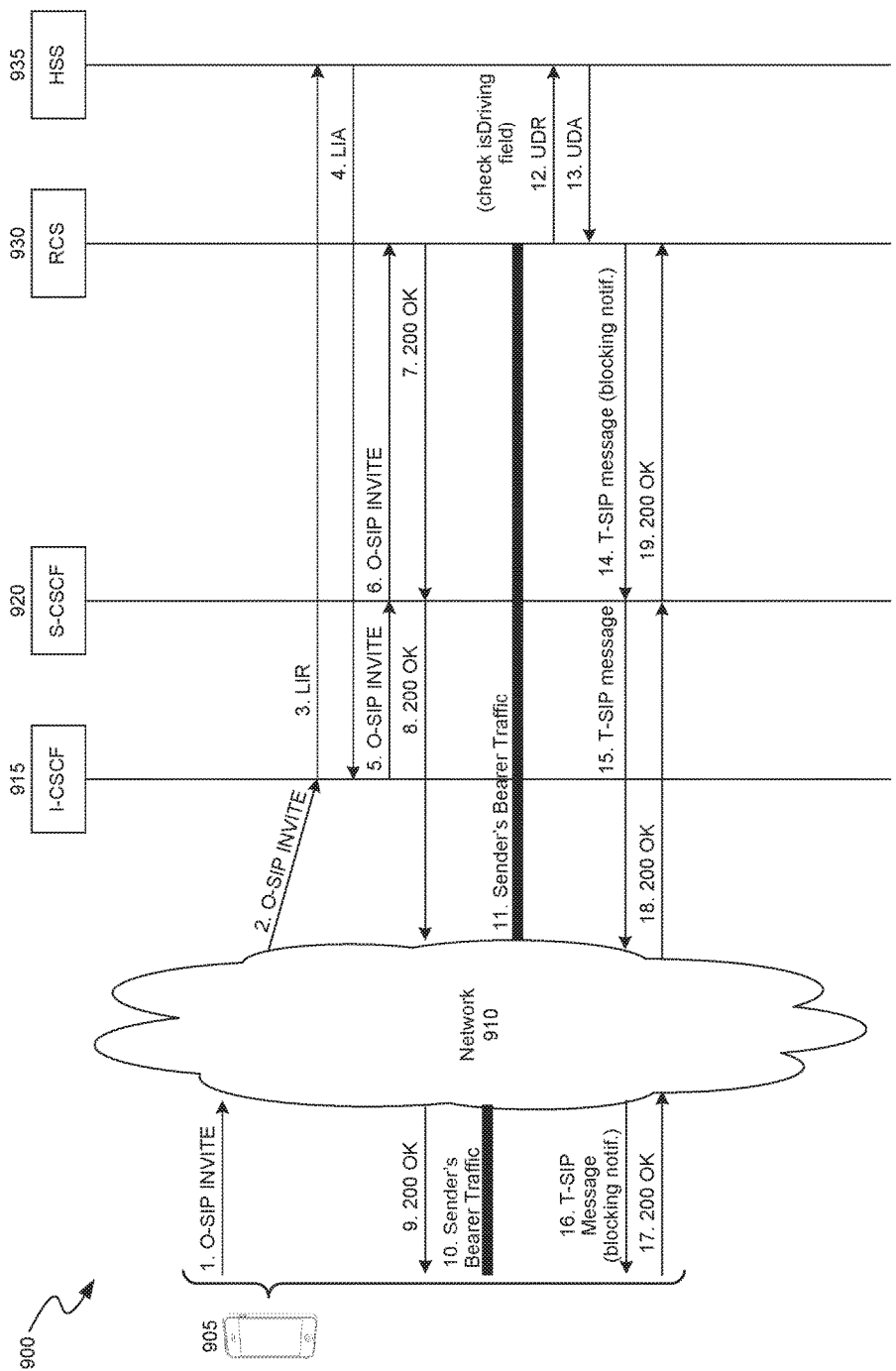
FIG. 9 is a call flow diagram showing an SIP INVITE procedure in an IMS network in accordance with an embodiment herein.

FIG. 9 is a call flow diagram showing an SIP INVITE procedure 900 in an IMS network in accordance with an embodiment herein. Mobile device 905 transmits O-SIP INVITE towards Network 901 (step 1). Network 910 transmits O-SIP INVITE towards I-CSCF 915 (step 2). I-CSCF 915 transmits Location Information Request (LIR) to HSS 935 (step 3). HSS 935 transmits Location Information Answer (LIA) to I-CSCF 915 (step 4). I-CSCF 915 transmits O-SIP INVITE towards S-CSCF 920 (step 5). S-CSCF 920 transmits O-SIP INVITE to Rich Communication Services (RCS) 930 (step 6). RCS 930 transmits 200 OK towards S-CSCF 920 (step 7). S-CSCF 920 transmits 200 OK towards network 910 (step 8). Network 910 transmits 200 OK towards mobile device 905 (step 9).

At step 10, bearer traffic is transmitted between mobile device 905 and network 910. At step 11, bearer traffic is transmitted between network 910, I-CSCF 915, S-CSCF 920, and RCS 930. RCS 930 transmits User Data Request (UDR) (to check isDriving field) towards HSS 935 (step 12). HSS 935 transmits User Data Answer (UDA) towards RCS 930 (step 13). RCS 930 transmits T-SIP Message (blocking notification) towards S-CSCF 920 (step 14). S-CSCF 920 transmits T-SIP Message (blocking notification) towards network 910 (step 15). Network 910 transmits T-SIP Message (blocking notification) towards mobile device 905 (step 16). Mobile device 905 transmits 200 OK towards network 910 (step 17). Network 910 transmits 200 OK towards S-CSCF 920 (step 18). S-CSCF 920 transmits 200 OK towards RCS 930 (step 19). The disclosed system may employ a variety of protocols to perform the messaging procedure 900, including SIP and Diameter protocol.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. When statements or subject matter in an incorporated by reference conflict with statements or subject matter of this application, then this application shall control.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, certain aspects of the disclosed system be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

I claim:

1. A computer-implemented method in a mobile telecommunications network to block delivery of messages to a destination mobile device located inside of a moving vehicle, the method comprising:
   receiving, at the mobile telecommunications network, from a message originator, an incoming message to be delivered to a destination mobile device;
   retrieving a driving status indicator from a Home Location Register (HLR) or a Home Subscriber Server (HSS) located within the mobile telecommunications network,
      wherein the driving status indicator provides an indication of whether the destination mobile device is in motion;
   analyzing the driving status indicator to determine whether the destination mobile device is in motion;
   in response to determining when the destination mobile device is in motion, adding the incoming message to a message queue within the mobile telecommunications network,
      wherein the incoming message remains in the message queue without delivery to the destination mobile device as long as the destination mobile device remains in motion; and
   in response to determining when the destination mobile device is not in motion, delivering the incoming message to the destination mobile device from the message queue within the mobile telecommunications network.

2. The computer-implemented method of claim 1, wherein the mobile telecommunications network is an Internet Multimedia Subsystem (IMS) network.

3. The computer-implemented method of claim 1, wherein the driving status indication includes an indication of a speed at which the destination mobile device is moving, and further wherein analyzing the driving status indicator to determine whether or not the destination mobile device is in motion comprises comparing the indicated speed to a predetermined threshold value.

4. The computer-implemented method of claim 1, wherein the driving status indicator is stored within a Home Location Register (HLR) or Home Subscriber Server (HSS) in the mobile telecommunications network.

5. The computer-implemented method of claim 1, wherein the method further comprises retrieving one or more messages previously stored in the message queue and delivering the one or more previously stored messages to the destination mobile device in response to determining that the destination mobile device is not in motion for greater than a threshold period of time.

6. The computer-implemented method of claim 1, wherein the method further comprises sending a delivery notification to the message originator in response to delivering the incoming message or the one or more queued messages to the destination mobile device.

7. The computer-implemented method of claim 1, wherein the method further comprises sending a blocking notification to the message originator in response to determining that the destination mobile device is in motion.

8. A non-transitory computer-readable medium storing instructions that, when executed by a processor in a mobile telecommunications network, cause the network to execute a method to block delivery of messages to a destination mobile device, the method comprising:
  receiving, at the mobile telecommunications network, from a message originator, an incoming message to be delivered to a destination mobile device;
  retrieving a status indicator from a Home Location Register (HLR) or a Home Subscriber Server (HSS) located within the mobile telecommunications network, wherein the status indicator provides an indication of whether the destination mobile device is not to receive messages or notifications;
  determining from the status indicator that the destination mobile device is not to receive messages or notifications;
  in response to determining that the destination mobile device is not to receive messages or notifications, adding the incoming message to a message queue within the mobile telecommunications network, wherein the incoming message remains in the message queue without delivery to the destination mobile device as long as the status indicator provides the indication that the destination mobile device is not to receive messages or notifications;
  determining that the destination mobile device can again receive messages; and
  delivering the incoming message to the destination mobile device from the message queue within the mobile telecommunications network.

9. The non-transitory computer-readable medium of claim 8, wherein the mobile telecommunications network is an Internet Multimedia Subsystem (IMS) network.

10. The non-transitory computer-readable medium of claim 8, wherein the status indicator is a driving status indication that includes an indication of a speed at which the destination mobile device is moving, and further comprising analyzing the driving status indicator to determine whether the destination mobile device is in motion by comparing the indicated speed to a predetermined threshold value.

11. The non-transitory computer-readable medium of claim 8, wherein the status indicator is a driving status indicator stored within a Home Location Register (HLR) or Home Subscriber Server (HSS) in the mobile telecommunications network.

12. The non-transitory computer-readable medium of claim 8, wherein the method further comprises retrieving one or more messages previously stored in the message queue and delivering the one or more previously stored messages to the destination mobile device in response to determining that the destination mobile device is not in motion.

13. The non-transitory computer-readable medium of claim 8, wherein the method further comprises sending a delivery notification to the message originator in response to delivering the incoming message or the one or more queued messages to the destination mobile device.

14. The non-transitory computer-readable medium of claim 8, wherein the method further comprises sending a blocking notification to the message originator in response to determining that the destination mobile device is in motion.

15. A system, in a mobile telecommunications network, adapted to block delivery of messages to a destination mobile device located inside of a moving vehicle, the system comprising:
  a memory;
  a processor coupled to the memory, wherein the system is further configured to:
    receive, at the system, from a message originator, an incoming message to be delivered to the destination mobile device;
    retrieve a driving status indicator from a Home Location Register (HLR) or a Home Subscriber Server (HSS) located within the mobile telecommunications network, wherein the driving status indicator provides an indication of whether the destination mobile device is in motion;
    analyze the driving status indicator to determine whether the destination mobile device is in motion;
    in response to determining when the destination mobile device is in motion, add the incoming message to a message queue, wherein the incoming message remains in the message queue without delivery to the destination mobile device as long as the destination mobile device remains in motion; and
    in response to determining when the destination mobile device is not in motion, deliver the incoming message to the destination mobile device.

16. The system of claim 15, wherein the mobile telecommunications network is an Internet Multimedia Subsystem (IMS) network.

17. The system of claim 15, wherein the driving status indication includes an indication of a speed at which the destination mobile device is moving, and further wherein analyzing the driving status indicator to determine whether or not the destination mobile device is in motion comprises comparing the indicated speed to a predetermined threshold value.

18. The system of claim 15, wherein the processor is further configured to retrieve one or more messages previously stored in the message queue and deliver the one or more previously stored messages to the destination mobile device in response to determining that the destination mobile device is not in motion.

19. The system of claim 15, wherein the processor is further configured to send a delivery notification to the message originator in response to delivering the incoming message or the one or more queued messages to the destination mobile device.

20. The system of claim 15, wherein the processor is further configured to send a blocking notification to the message originator in response to determining that the destination mobile device is in motion.

21. The method of claim 1 wherein in response to determining when the destination mobile device is in motion, determining whether the destination mobile device is in proximity to a position of a driver in the moving vehicle.

* * * * *